(No Model.)

C. D. REYNOLDS.
GEM SETTING.

No. 460,161. Patented Sept. 29, 1891.

WITNESSES,
Charles Hannigan
H. E. Carpenter

INVENTOR
Charles D. Reynolds
by Remington & Henthorn
Attys

UNITED STATES PATENT OFFICE.

CHARLES D. REYNOLDS, OF PROVIDENCE, RHODE ISLAND.

GEM-SETTING.

SPECIFICATION forming part of Letters Patent No. 460,161, dated September 29, 1891.

Application filed December 8, 1890. Serial No. 373,928. (No model.)

*To all whom it may concern:*

Be it known that I, CHARLES D. REYNOLDS, a citizen of the United States, residing at Providence, in the county of Providence and State of Rhode Island, have invented certain new and useful Improvements in Gem-Settings; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

In the production of gem-settings as heretofore usually made, particularly those known as "cup-settings"—that is, settings having closed backs and arranged to be employed as "pendants"—the eyes are soldered to the backs or bases of the setting.

There are several objections to settings having soldered eyes, viz: the cost of the product is greatly increased, a better quality of plate is required when hard solder is used to secure the eyes, and greater care is necessary in the manufacture, thus calling for skilled labor. Even then the eyes are not always properly soldered, and the cost for repairs is also to be considered.

The object I have in view is to overcome all the objections or disadvantages just referred to and as inherent in the manufacture of pendant gem-settings as usually made.

My invention consists, essentially, in forming from one piece of stock the base or back, the points or prongs, and the open eye or ear by which the setting may be attached to form a pendant. By means of my improvement the several parts just named are integral with the setting. No solder is used. Therefore the cost of production is greatly reduced. In fact I can produce a hundred-fold more settings than can be produced in the usual manner, the cost of labor being the same in both instances.

Another advantage of my invention is that the peripheral edge of the setting and also the points or prongs are beveled off, so as to expose but a very little, if any, of the metal when viewed from the front of the mounted stone.

Figure 1:
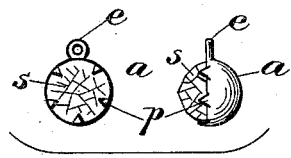
Figure 2:
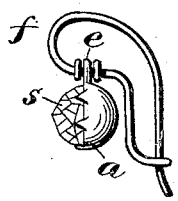
Figure 3:
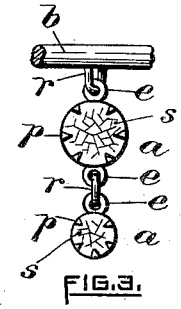
Figures 4, 5:
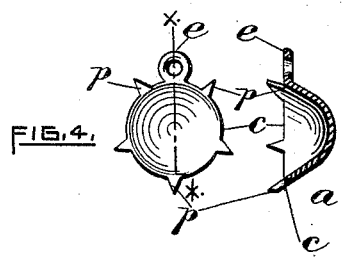
Figures 6, 7:
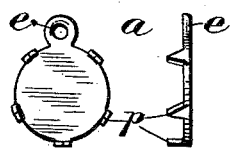
Figure 8:
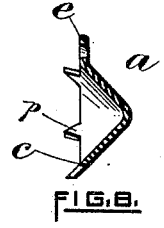
Figure 9:
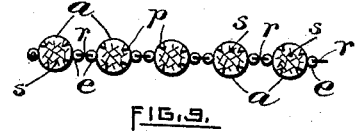
Figures 10, 11:
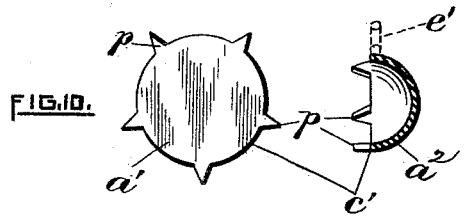

In the appended drawings, Figure 1 represents front and side elevations of a gem-setting embodying my improvements. Fig. 2 shows the same when mounted to form an ear drop or pendant. Fig. 3 is a front view showing a manner of arranging the setting to form a double pendant. Fig. 4 is a front view of the setting, minus the stone, as punched or cut from sheet metal. Fig. 5 is a transverse sectional view taken on line $x$ $x$ of Fig. 4. Fig. 6 is a front view of my improved setting, having a flat back. Fig. 7 is a side view thereof. Fig. 8 is a central sectional view showing a slightly modified form of the back or base. Fig. 9 shows a piece of chain or bracelet composed of a series of my improved gem-settings linked together. Fig. 10 is a front view of a blank as usually made and as cut from a sheet of flat stock, and Fig. 11 is a central sectional view of the blank after being cup-shaped to form a setting. In order to produce a pendant, an eye is soldered to the upper edge, as indicated by dotted lines.

Again referring to the drawings, $a$ indicates my improved gem-setting as a whole, minus the stone $s$. The back of the setting may be cup-shaped, as in Fig. 5, &c.; cone shape, as in Fig. 8; flat, as in Figs. 6 and 7; or it may have any other suitable form. Around the edge or periphery of the setting are arranged a series of integrally-formed points or prongs $p$, and one or more integrally-formed eyes $e$.

In making the settings $a$ I preferably bevel the edges of the die and cutter so as to give a sharp or beveled edge to the portions between the points, as at $c$, Figs. 4, 5, and 8. This result may be attained simultaneously with the cutting of the setting, including the eye $e$, from the stock. In like manner the points $p$ may be beveled or reduced in thickness, as indicated in said Figs. 5 and 8.

$a^2$, Fig. 11, represents the usual form of cup-shape settings. As thus made it will be seen that the upper or peripheral edge $c'$, and also the points, are not beveled, but flat, thus exposing the metal to a considerable extent when viewed from the front of the mounted stone. In such common form of setting the eye $e'$ (indicated by dotted lines) is first formed from wire or other suitable stock and then secured by solder to the setting $a^2$, the latter being produced from a blank $a'$, substantially as indicated by Fig. 10.

My improved settings *a* are adapted as mounts for foil-back brilliants, white and colored stones, &c. By means of the integral eyes *e* the settings may be mounted as pendants for ear-drops, bangles, &c. In some cases I provide each setting with two or more eyes and link a series of the settings together by rings *r*, thus producing a chain of settings. (See Figs. 3 and 9.)

I claim as new and desire to secure by United States Letters Patent—

1. As a new article of manufacture, a metallic setting having its base, points, and eye or eyes composed of a single piece or blank, substantially as hereinbefore set forth.

2. The integrally-formed gem-setting hereinbefore described, having a base, gem-holding points, one or more pendant-eyes *e*, arranged in the same plane with the face of the gem and having a beveled circumscribing edge *c*, substantially as and for the purpose set forth.

3. A chain or bracelet composed of a series of gem-settings linked together, each setting consisting of a base portion having gem-holding points and two pendant-eyes *e*, all formed of a single piece or blank, and stones or other ornaments *s*, mounted in said settings, substantially as hereinbefore set forth.

4. As a new article of manufacture, a gem-setting comprising a base, having an eye and points forming a part thereof and all disposed on the periphery of said base.

In testimony whereof I have affixed my signature in presence of two witnesses.

CHARLES D. REYNOLDS.

Witnesses:
CHARLES HANNIGAN,
GEO. H. REMINGTON.